US006993288B2

(12) United States Patent  (10) Patent No.: US 6,993,288 B2
de La Chapelle et al.  (45) Date of Patent: Jan. 31, 2006

(54) MANAGING SATELLITE FIXED BEAM UPLINK USING VIRTUAL CHANNEL ASSIGNMENTS

(75) Inventors: Michael de La Chapelle, Bellevue, WA (US); David C. Morse, Bellevue, WA (US); Leonard J. Quadracci, Seattle, WA (US)

(73) Assignee: The Boeing Company, Chicago, IL (US)

( * ) Notice: Subject to any disclaimer, the term of this patent is extended or adjusted under 35 U.S.C. 154(b) by 514 days.

(21) Appl. No.: 10/197,146

(22) Filed: Jul. 17, 2002

(65) Prior Publication Data

US 2004/0014472 A1    Jan. 22, 2004

(51) Int. Cl.
 *H04B 7/185*    (2006.01)
(52) U.S. Cl. ............... 455/12.1; 455/447; 455/427; 370/316; 370/315; 342/352; 342/354
(58) Field of Classification Search ............ 455/429, 455/447, 446, 450, 427, 431, 13.1, 25, 12.1; 370/316, 315; 342/352, 354
 See application file for complete search history.

(56) References Cited

U.S. PATENT DOCUMENTS

| | | |
|---|---|---|
| 5,355,512 A | 10/1994 | Profera, Jr. |
| 5,367,304 A | 11/1994 | Jan et al. |
| 5,574,969 A | 11/1996 | Olds et al. |
| 5,749,044 A | 5/1998 | Natarajan et al. |
| 5,752,162 A | 5/1998 | Sawyer et al. |
| 5,809,397 A | 9/1998 | Harthcock et al. |
| 5,835,487 A | 11/1998 | Campanella |
| 5,839,053 A | 11/1998 | Bosch et al. |
| 6,452,962 B1 * | 9/2002 | Linsky et al. ............... 375/145 |
| 6,463,279 B1 * | 10/2002 | Sherman et al. ............ 455/427 |
| 6,507,926 B1 * | 1/2003 | Wright ....................... 714/776 |
| 6,707,916 B1 * | 3/2004 | Caso et al. ................. 380/270 |
| 6,868,269 B1 * | 3/2005 | Hagen et al. ............... 455/429 |
| 2002/0081969 A1 * | 6/2002 | Chang et al. .............. 455/13.1 |

* cited by examiner

*Primary Examiner*—Danh Cong Le
(74) *Attorney, Agent, or Firm*—Harness Dickey & Pierce P.L.C.

(57) ABSTRACT

A method of coordinating communications between ground stations and fixed beam satellites is provided, wherein each beam of a satellite antenna is assigned a color to create a color pattern that matches a frequency reuse pattern for the antenna, thereby using the same frequencies in a different beam with the same color. In operation, a ground station requests a virtual channel number from a resource manager, which sends a virtual channel number that is not used by another ground station within a beam diameter of the requesting ground station. The ground station then determines the position of the satellite, the beam and beam color, and further computes the frequency, polarization, and time slot, among other information, to communicate with the satellite. A method is also provided for managing virtual channels that comprises a network manager that groups ground stations and limits the number of virtual channels per group.

27 Claims, 4 Drawing Sheets

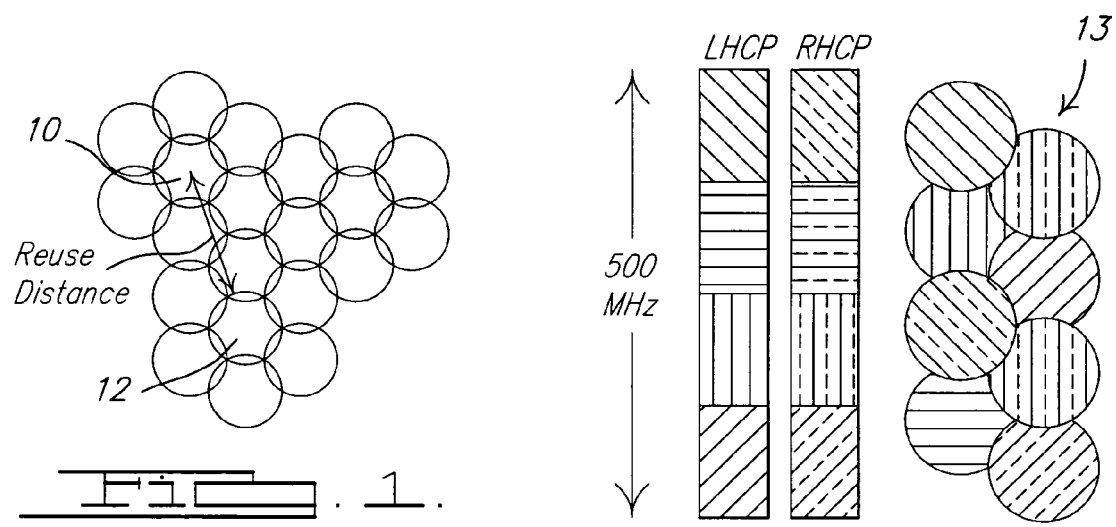
Fig. 1.
Fig. 2.
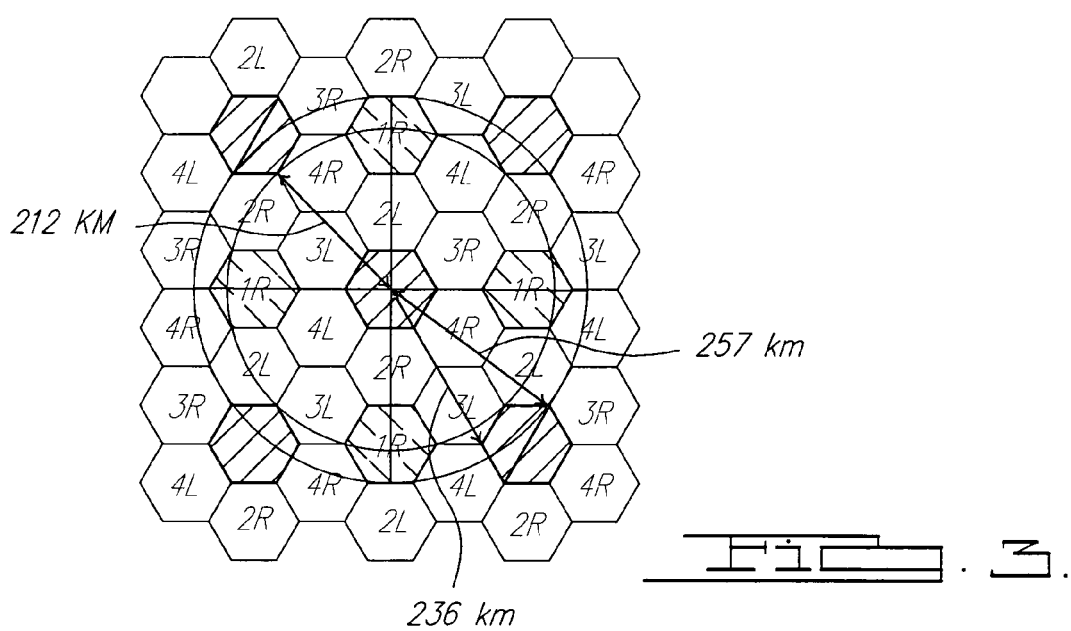
Fig. 3.
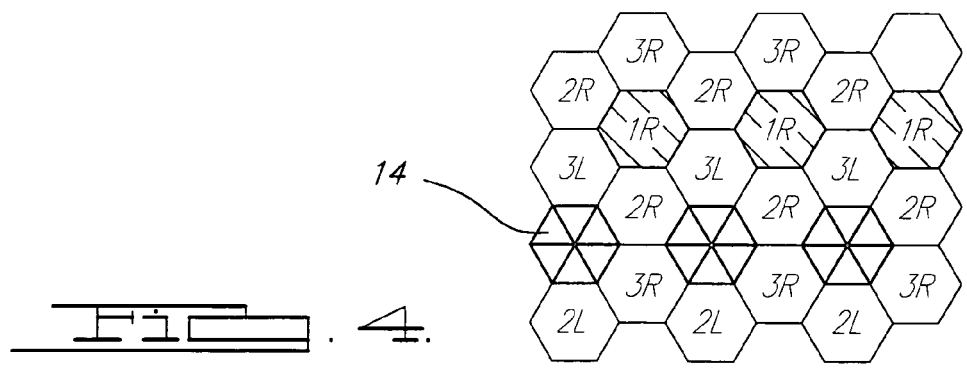
Fig. 4.

MANAGING SATELLITE FIXED BEAM UPLINK USING VIRTUAL CHANNEL ASSIGNMENTS

FIELD OF THE INVENTION

The present invention relates generally to satellite communication systems and more particularly to methods of uplinking to fixed beam satellites and managing uplink capacity.

BACKGROUND OF THE INVENTION

Satellite communications generally involve a plurality of ground stations that uplink to a plurality of satellites at defined frequencies, wherein the satellites downlink data to the ground stations, which then transmit the data to remote locations such as television or radio broadcast facilities and computer networks, among a plurality of other locations that may utilize the data for a variety of purposes. Although the types of satellite communications differ widely, there exist two primary techniques for establishing and maintaining communications between ground stations and satellites, namely, fixed frequency and fixed beam.

A fixed frequency satellite system coordinates uplink communications between ground stations and satellites by allocating a fixed frequency to a single ground station such that the ground station continuously uplinks at the fixed frequency. The satellite then directs a beam at the ground station, and the ground station continues to uplink at the fixed frequency while the satellite flies over the ground station and redirects the beam accordingly. Since the satellite must continuously redirect its beams to fixed ground stations on earth, the fixed frequency satellite system requires an extremely complex and expensive antenna.

A fixed beam satellite system, as the name implies, directs beams at the same direction towards the earth, and as the satellite flies over ground stations, the ground stations move from one beam to another. Current fixed beam uplink coordination techniques require that the satellite "track" each ground station, such that as the ground station moves from one uplink beam to another, the satellite must move a supporting demodulator to the correct beam. As a result, the satellite must reconfigure many demodulators quickly and frequently. Furthermore, demodulator fragmentation adds certain inefficiencies when multiple ground stations are positioned within a single beam, thus sharing the same demodulator bank, and are then positioned in separate beams, having different demodulator banks, as the satellite flies over the earth. Although it is possible to reduce demodulator fragmentation by having the satellite cause the ground station to change frequency, reliable satellite to ground station communications may be adversely affected. As a result, the management of individual users in realtime becomes complicated, and demodulator fragmentations causes inefficient use of resources onboard the satellite.

Accordingly, there remains a need in the art for a method of managing communications between ground stations and satellites that avoids the cost and complexity of fixed frequency antennas while improving the efficiency of uplinks between the ground stations and the satellites.

SUMMARY OF THE INVENTION

The present invention is directed by a method of coordinating communications between ground stations and fixed beam satellites wherein the ground stations determine uplinks as the satellites fly over the ground stations. In one form of the present invention, each beam of a fixed beam satellite antenna is assigned a color to create a color pattern that matches a frequency reuse pattern for the antenna. The number of user channels allocated to the satellite are then divided into equal groups that equal the number of beam colors within the color pattern. Further, the ground stations request virtual channel numbers from the satellites such that a virtual channel number is assigned to a ground station only when the same virtual channel number is not used by another ground station within a beam diameter of the requesting ground station. Once the ground station receives a virtual channel number and additional satellite parameters such as location and attitude, the ground station determines the beam color and thus an uplink frequency and polarization and uplinks to a satellite.

Accordingly, identical frequencies are re-used in a different beam with the same color, and the ground station moves between beam colors, or uplink beams, over time while continually changing uplink parameters to match each new beam color. Moreover, as the ground station moves from beam color to beam color, and from satellite to satellite, the uplink parameters change but the virtual channel number remains the same. The goal, therefore, of the method according to the present invention is to design a color pattern that uses the fewest number of colors.

Preferably, the satellites maintain a list of ground stations with uplink capacity, and the list comprises a virtual channel number and a location for each ground station. Additionally, the virtual channel number of the ground station passes from satellite to satellite as the satellites pass over the ground stations such that a footprint overlap area is less than one uplink cell. Further, the virtual channel number of the ground station passes from satellite to satellite independent of phasing or matching orientations. Accordingly, ground stations are not required to request bandwidth on rising satellites, as the virtual cell assignment passes from satellite to satellite when the ground station computes the beam color of the new satellite and uplinks with parameters for that color.

In another preferred form, the satellite is implemented as a "bent pipe" and the assignment of the virtual channels occurs in the gateway. The satellite is configured by the ground to allocate the correct resources to the beam but real time channel processing is performed in the gateway.

In another preferred form, a method of managing the virtual channels is provided, wherein a network manager groups ground stations and limits the number of virtual channels per group. The ground stations register with the network manager, and thus the network manager limits the number of virtual channels that the ground station may request. The ground stations may be grouped according to geographic boundaries, service providers, or types of grounds stations, among a plurality of other possible groupings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a diagram of a beam pattern that illustrates a reuse distance in accordance with the present invention;

FIG. 2 is a diagram illustrating a frequency spectrum divided into a number of groups that are mapped into a beam pattern in accordance with the present invention;

FIG. 3 is an exemplary color pattern in accordance with the present invention;

FIG. 4 is an alternate color pattern comprising beamlets in accordance with the present invention;

FIG. 8 is a diagram illustrating groups of ground stations in accordance with the present invention.

DETAILED DESCRIPTION OF THE PREFERRED EMBODIMENT

Figure 5:
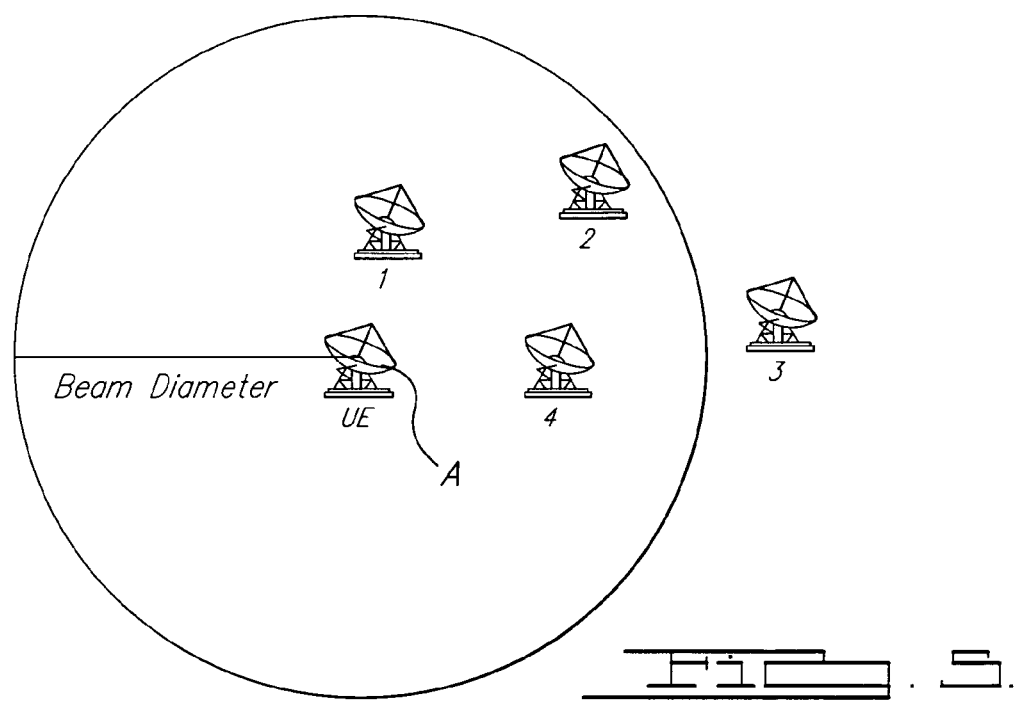
FIG. 5 is a diagram illustrating a plurality of grounds stations within a single beam color in accordance with the present invention.

The following description of the preferred embodiments is merely exemplary in nature and is in no way intended to limit the invention, its application, or uses.

In summary, a method of coordinating communications between ground stations and fixed beam satellites according to the present invention generally comprises a ground station sending a message to a resource manager (either on the satellite or in a gateway) requesting a virtual channel number, the resource manager searching for an available virtual channel number, and the resource manager downlinking the virtual channel number to the requesting ground station. Further, the ground station then uses the virtual channel number, the satellite location, the satellite attitude, the ground station location, and beam indicia of the satellite to determine the uplink frequency and polarization. Preferably, the beam indicia is colors, however, other indicia such as numbers or alphabetical designations, among others, may also be used while remaining within the scope of the present invention. The operation of beam colors and virtual channel numbers that allow ground stations to determine uplinks is described in greater detail in the following.

Beam Colors/Color Patterns

Referring to the drawings, each beam of a satellite antenna is assigned a color to create a color pattern that matches a frequency reuse pattern for the antenna as illustrated in FIG. 1. The method according to the present invention operates on the principle that the same frequency can be reused in a different beam with the same color. Further, the lower the side lobe level on the antenna, the fewer number of beams in the reuse pattern. As shown, the reuse distance is measured from the center of a beam 10 to the edge of a beam 12 with the same color. Thus, a pattern of indicia assigned to antenna beams, whether colors, binary designations or specific numbers, among others, which uses the fewest number of such indicia, will result in an increase in the number of ground stations that may uplink to the satellite on the same frequency.

Once the color pattern has been established, the number of user channels allocated to the satellite is then divided into equal groups, which preferably equals the number of different beam colors defined by the color pattern. An exemplary division of groups is illustrated in FIG. 2, wherein the frequency spectrum is divided into eight (8) groups, four (4) for each of the two (2) polarizations, LHCP (left hand circular polarized) and RHCP (right hand circular polarized). As shown, the eight (8) color grouping is mapped to an eight (8) color, two (2) polarization beam pattern, thereby creating the color pattern 13. Additionally, the colors may be further divided by CDMA or TDMA blocks in accordance with methods commonly known in the art.

Referring now to FIG. 3, an exemplary color pattern in accordance with the methods of the present invention is illustrated, which is an eight (8) color pattern for 118 km beams. As shown, the eight (8) color pattern is repeated throughout the beams on an antenna. The numbers 1L, 2L, 3L, 4L, 1R, 2R, 3R, 4R correspond to the beam color pattern. The 212 Km is the beam to user reuse distance. The 257 km refers to the center of a beam to center of a beam reuse distance.

Referring to FIG. 4, the eight (8) color pattern for 118 km beams as previously described may be further divided into beamlets 14 to increase capacity density, wherein each beamlet 14 has a separate color. When the beams are further divided into beamlets 14, however, the ground stations will be required to change uplink channels and polarization more often.

Since each of the beams is assigned a set of channels, and the ground stations have information such as the beam color assignments, the satellite position and attitude, and the ground station location, the ground stations use a virtual channel number to uplink to the satellite. The virtual channel number assignment process as used to assign uplink capacity to ground stations is described in greater detail below.

Virtual Channel Numbers

When a ground station requires bandwidth, the ground station requests a virtual channel number from a resource manager either on the satellite or at a gateway. (The request may further include the location of the ground station such that the management techniques as described in further detail below may also be employed). The resource manager receives the request for a virtual channel number and assigns a number to the ground station that is not used by another ground station within a beam diameter of the requesting ground station. Accordingly, the resource manager maintains a list of all ground stations that have uplink capacity, which includes the location and virtual channel number for each ground station.

Referring to FIG. 5, an example of a request for a virtual channel number from the ground station A is shown. Since there are three (3) ground stations having virtual channel numbers 1, 2, and 4 within the same beam diameter as ground station A, the satellite cannot assign virtual channel numbers 1, 2, or 4 to ground station A. However, virtual channel number 3 is available, since the ground station having virtual channel number 3 is not within the beam diameter shown, and is therefore guaranteed to be a different beam color. Further, the maximum virtual channel number is defined by the number of user channels after the color pattern is established as previously described. Therefore, the virtual cell number method according to the present invention is applicable to satellite communications where antenna beams register changes on the earth as a function of time. Moreover, the resource manager checks for virtual channel numbers without regard to the current location of any satellite beam and thus is operable without real time requirements. Further, the resource manager does not have to compensate for satellite movement during the assignment process.

After a virtual channel number is found, the virtual channel number is downlinked to the requesting ground station. The ground station then computes the position of the satellite (based on the available ephemeris data used to track a NGSO satellite), and then determines the beam and beam color that currently encompasses the ground station. Based on the virtual channel number and the beam color, the ground station determines the frequency, polarization, timeslot or code, and other satellite and communication information required for satellite communication. As time passes, the ground station moves between uplink beams and must therefore change uplink parameters to match each new beam color.

Figure 6A:
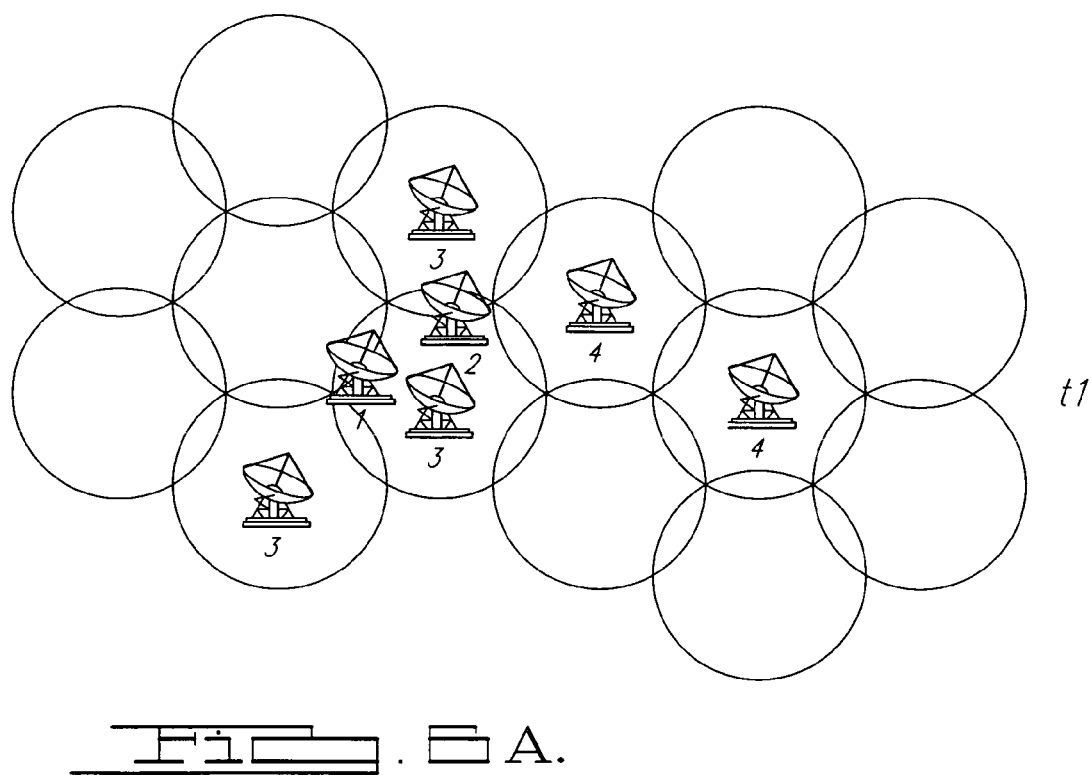
FIG. 6A is a diagram illustrating a plurality of ground stations within a color pattern at a time t1 in accordance with the present invention.
Figure 6B:
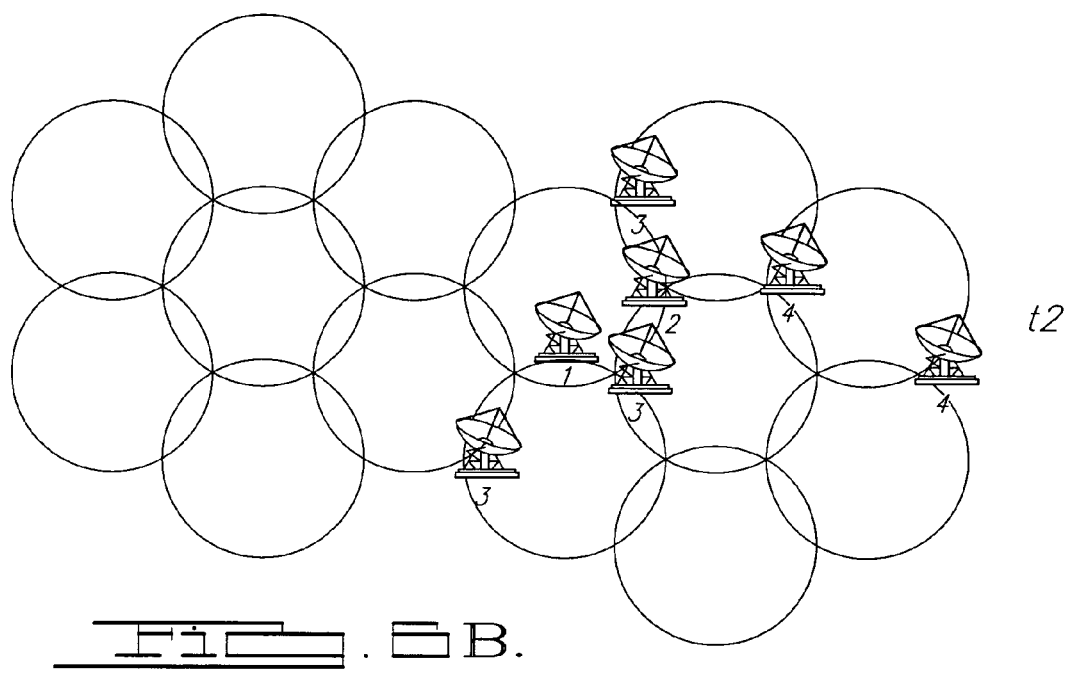
FIG. 6B is a diagram illustrating a plurality of ground stations within a color pattern at a time t2 in accordance with the present invention.

Referring now to FIGS. 6A and 6B, the effect of checking beam distance is illustrated. At a time t1 in FIG. 6A, more than one ground station is positioned within a beam, however, any one beam has only one ground station with the same virtual channel number. At a time t2 in FIG. 6B, or any other time, a distance check ensures that there is never more than one ground station in any beam with the same virtual channel number. Accordingly, a condition always exists where as a ground station moves into a beam, another ground station with the same virtual channel number moves out of the beam. Further, such a condition is independent of satellite position or attitude.

Ground Station Handover Between Satellites

Figure 7:
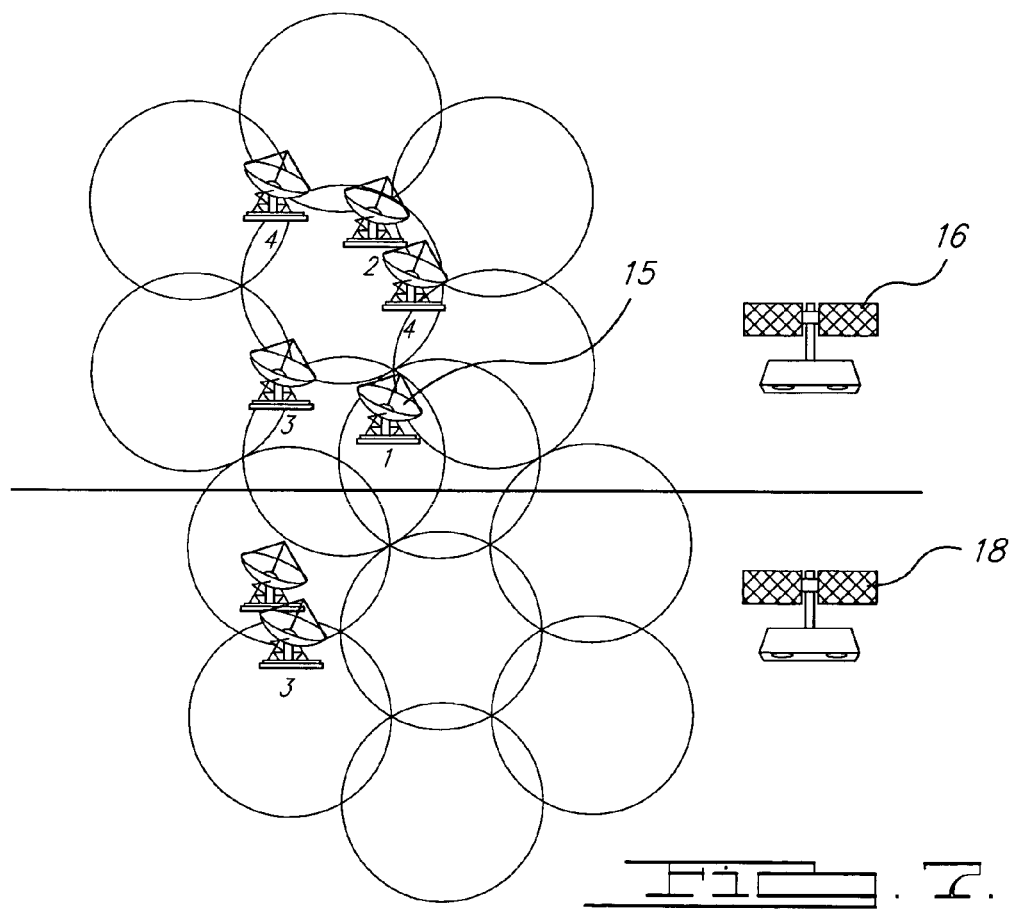
FIG. 7 is a diagram illustrating ground station satellite-to-satellite handover in accordance with the present invention.
Figure 5:
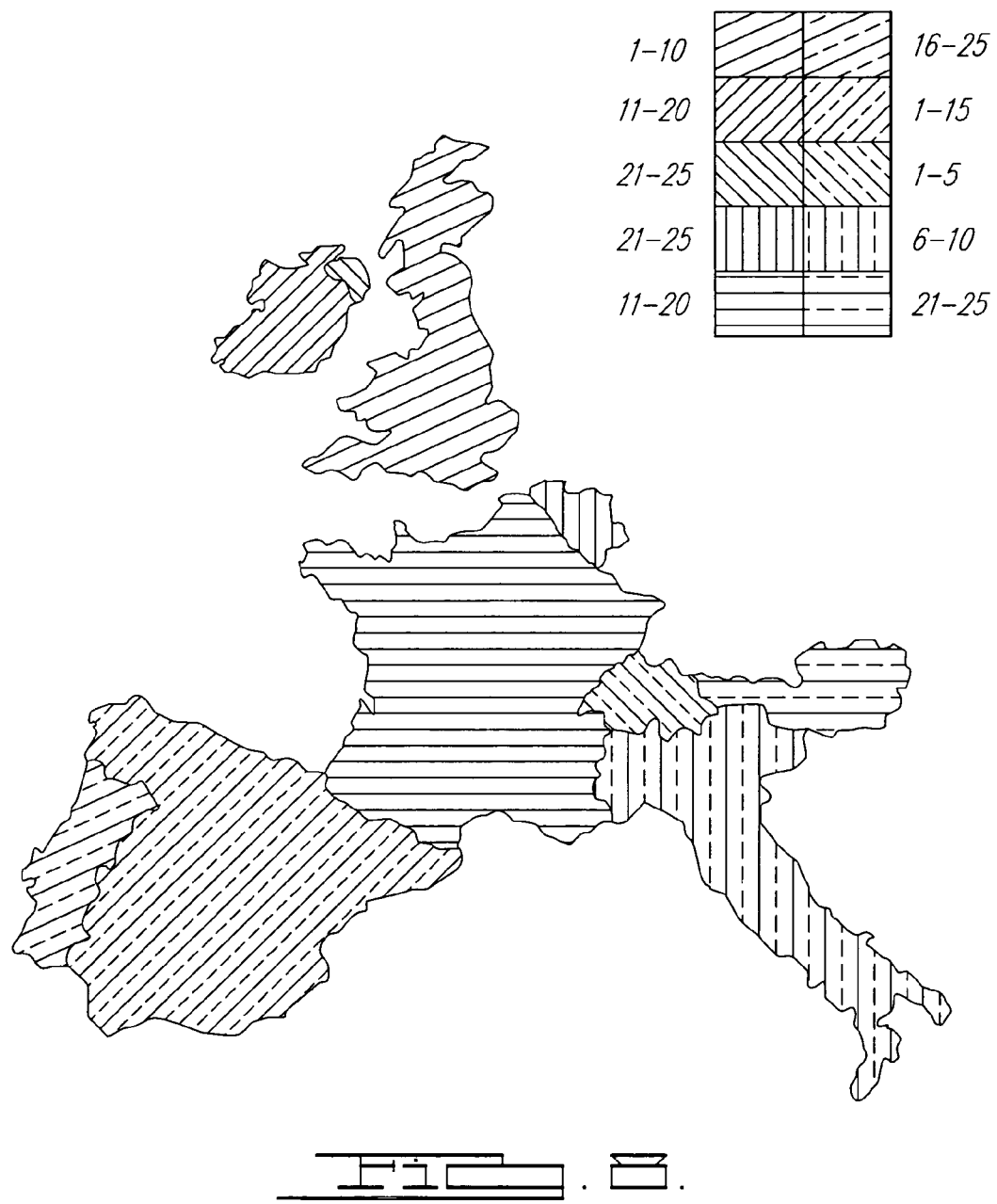

Referring to FIG. 7, when a requesting ground station 15 is near the edge of a satellite footprint, the resource manager for satellite 16 must coordinate the virtual channel assignment with the resource manager for neighboring satellite 18. Accordingly, when the ground station 15 moves from satellite 16 to satellite 18, the ground station 15 computes the beam color of satellite 18 and uplinks with the parameters for that color. Generally, resource managers coordinate the assigned virtual channel assignments via traditional terrestrial or satellite to satellite communication links. Therefore, ground stations are not required to request bandwidth on rising satellites, rather, the virtual cell assignment passes from satellite to satellite as the ground station uplinks to the new satellite.

Management of Virtual Channels

The virtual channels as previously described may further be used to manage uplink resources, wherein ground stations register with at least one network manager, and the network manager then limits the number of virtual channels that the ground station may request. Further, the limitations on the number of virtual channels per ground station allow the network manager to group or separate users. FIG. 8 illustrates an exemplary grouping of ground stations by geographical boundaries, wherein specific virtual channel numbers within each of the polarizations are reserved for each country. Alternate groupings may also be employed in accordance with the teachings of the present invention, which may include, for example, groupings based on ground station types or service providers, among others.

In operation, the network manager assigns the virtual channels that a ground station may request from a satellite. The ground station then requests a virtual channel number from a satellite, and the satellite searches for a virtual channel number that is not being used within the beam diameter of the requesting ground station. When the satellite determines a valid virtual channel number, the virtual channel number is downlinked to the requesting ground station. The ground station then uses the position of the satellite to determine the uplink beam and beam color, and with the beam color and virtual channel number assignment, the ground station may determine the uplink frequency and polarization. As the ground station moves from beam color to beam color, and from satellite to satellite, the uplink frequency and polarization change, but the virtual channel number remains the same.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A method of coordinating communications between ground stations and fixed beam satellites, the method comprising the steps of:
    (a) assigning a color to each beam of an antenna on a satellite to create a color pattern, wherein the color pattern matches a frequency reuse pattern for the antenna;
    (b) dividing a number of user channels allocated to the satellite into equal groups that equal the number of beam colors within the color pattern;
    (c) requesting a virtual channel from a resource manager;
    (d) searching for available channels and sending a virtual channel number to the ground station, wherein the virtual channel number is assigned to the ground station when the same virtual channel number is not used by another ground station within a beam diameter of the requesting ground station;
    (e) receiving the virtual channel number and satellite parameters; and
    (f) determining an uplink frequency and polarization based on the virtual channel number and satellite parameters by the ground station,
wherein identical frequencies are reused in a different beam with the same color and the ground station moves between beam colors over time.

2. The method of claim 1, wherein the satellite parameters comprise satellite location and satellite attitude.

3. The method of claim 1, wherein the beam colors are divided by TDMA blocks.

4. The method of claim 1, wherein the beam colors are divided by CDMA blocks.

5. The method of claim 1, wherein the beam colors are divided into virtual beamlets having different colors.

6. The method of claim 1, wherein the satellites maintain a list of ground stations with uplink capacity, wherein the list comprises a virtual channel number and a location for each ground station.

7. The method of claim 1, wherein the reuse pattern is defined by distances from the center of a beam to the edge of a beam with the same color.

8. The method of claim 1, wherein the virtual channel number of the ground station passes from satellite to satellite such that a footprint overlap area is less than one uplink cell.

9. The method of claim 1, wherein the virtual channel number of the ground station passes from satellite to satellite independent of phasing.

10. The method of claim 1, wherein the virtual channel number of the ground station passes from satellite to satellite independent of matching orientations.

11. The method of claim 1, wherein the ground stations are registered with a network manager that assigns the virtual channel numbers to classes of ground stations.

12. A method of coordinating communications between ground stations and fixed beam satellites, the method comprising the steps of:
    (a) assigning a color to each beam of an antenna on a satellite to create a color pattern, wherein the color pattern matches a frequency reuse pattern for the antenna;

(b) dividing a number of user channels allocated to the satellite into equal groups that equal the number of beam colors within the color pattern;

(c) allocating virtual channel numbers to ground stations, wherein the virtual channel number is assigned to the ground station when the same virtual channel number is not used by another ground station within a beam diameter of the requesting ground station; and (d) computing uplink frequency and polarization based on the virtual channel number and satellite parameters by the ground station, wherein identical frequencies are reused in a different beam with the same color and the ground station moves between beam colors over time.

13. The method of claim 12, wherein the satellite parameters comprise satellite location and satellite attitude.

14. The method of claim 12, wherein the beam colors are divided by TDMA blocks.

15. The method of claim 12, wherein the beam colors are divided by CDMA blocks.

16. The method of claim 12, wherein the beam colors are divided into virtual beamlets having different colors.

17. The method of claim 12, wherein the satellites maintain a list of ground stations with uplink capacity, wherein the list comprises a virtual channel number and a location for each ground station.

18. The method of claim 12, wherein the reuse pattern is defined by distances from the center of a beam to the edge of a beam with the same color.

19. The method of claim 12, wherein the virtual channel number of the ground station passes from a satellite to a resource manager such that a footprint overlap area is less than one uplink cell.

20. The method of claim 12, wherein the virtual channel number of the ground station passes from satellite to satellite independent of phasing.

21. The method of claim 12, wherein the virtual channel number of the ground station passes from satellite to satellite independent of matching orientations.

22. The method of claim 12, wherein the ground stations are registered with a network manager that assigns the virtual channel numbers to classes of ground stations.

23. A method of coordinating communications between base stations and fixed beam satellites, the method comprising the steps of:

(a) assigning a color to each beam of an antenna on a satellite to create a color pattern, wherein the color pattern matches a frequency reuse pattern for the antenna;

(b) dividing a number of user channels allocated to the satellite into groups in relation to the number of beam colors used;

(c) allocating virtual channel numbers to base stations, wherein the virtual channel number is assigned to the base station when the same virtual channel number is not used by another base station within a beam diameter of the requesting base station; and (d) computing uplink frequency and polarization based on the virtual channel number and satellite parameters by the base station, wherein identical frequencies are reused in a different beam with the same color and the base station moves between beam colors over time.

24. A method of coordinating communications between ground stations and fixed beam satellites, the method comprising the steps of:

(a) assigning an indicia to each beam of an antenna on a satellite to create an indicia pattern, wherein the indicia pattern matches a frequency reuse pattern for the antenna;

(b) dividing a number of user channels allocated to the satellite into equal groups that equal the number of beam indicia within the indicia pattern;

(c) requesting a virtual channel from a resource manager;

(d) searching for available channels and sending a virtual channel number to the ground station, wherein the virtual channel number is assigned to the ground station when the same virtual channel number is not used by another ground station within a beam diameter of the requesting ground station;

(e) receiving the virtual channel number and satellite parameters; and (f) determining an uplink frequency and polarization based on the virtual channel number and satellite parameters by the ground station, wherein identical frequencies are reused in a different beam with the same indicia and the ground station moves between beam indicia over time.

25. The method according to claim 24, wherein the indicia is a color.

26. The method according to claim 24, wherein the indicia is a number.

27. The method according to claim 24, wherein the indicia is an alphabetic designation.

* * * * *